United States Patent [19]

Mathis

[11] 4,043,972

[45] Aug. 23, 1977

[54] STABILIZING POLYAMIDE ANTISTATIC COMPOSITIONS

[75] Inventor: Ronald D. Mathis, Taylors, S.C.

[73] Assignee: Phillips Fibers Corporation, Greenville, S.C.

[21] Appl. No.: 620,085

[22] Filed: Oct. 6, 1975

[51] Int. Cl.² ............................................. C08J 3/20, C08L 3/00; C08K 5/50

[52] U.S. Cl. ............................................. 260/45.9 NC

[58] Field of Search ................................. 260/45.9 NC

[56] References Cited

U.S. PATENT DOCUMENTS

| | | | |
|---|---|---|---|
| 2,979,528 | 4/1961 | Lundstead | 260/584 |
| 3,505,285 | 4/1970 | Hermann et al. | 260/45.75 |
| 3,560,419 | 2/1971 | Crovatt et al. | 260/18 |
| 3,594,346 | 7/1971 | Hermann et al. | 260/45.7 |
| 3,629,365 | 12/1971 | Gardner | 260/857 PE |
| 3,657,386 | 4/1972 | Weedon et al. | 260/857 |
| 3,666,717 | 5/1972 | Davy et al. | 260/45.95 |
| 3,691,131 | 9/1972 | Kelmchuk | 260/45.75 C |
| 3,772,403 | 11/1973 | Wells | 260/45.85 |
| 3,794,631 | 2/1974 | Wells et al. | 260/18 N |
| 3,888,944 | 6/1975 | Crescentini et al. | 260/45.85 |

FOREIGN PATENT DOCUMENTS 2,151,035  4/1973  France

*Primary Examiner*—V. P. Hoke

[57] ABSTRACT

In polyamides containing the reaction product of (1) a propylene oxide-ethylene oxide block copolymer based on ethylene diamine and (2) a dicarboxylic acid ester in an amount sufficient to provide improved antistatic characteristics to the polyamide, the tensile strength loss on exposure to heat is reduced by adding a thermal stabilizing amount of a phosphine oxide.

12 Claims, No Drawings

STABILIZING POLYAMIDE ANTISTATIC COMPOSITIONS

This invention relates to polyamide compositions. In another aspect, this invention relates to polyamide compositions containing an antistatic agent. In a further aspect, this invention relates to antistatic polyamide compositions containing an additive which reduces the tendency of such antistatic polyamide compositions to deteriorate in response to heat.

Among the antistatic agents disclosed in French Pat. No. 2,151,035 to BASF Wyandotte Corporation are those obtained when the product resulting from the condensation of ethylene oxide, propylene oxide and an alkylene diamine such as ethylene diamine is reacted further with dicarboxylic acid esters.

It has been discovered that the thermal stability of polyamide compositions containing such antistatic agents tends to be adversely affected by heat.

Accordingly, an object of this invention is to provide additives which will increase the thermal stability of polyamide compositions containing antistatic agents such as those mentioned above.

Other objects of this invention will be apparent to those skilled in the art.

The objects of this invention are achieved by forming a mixture of a polyamide, the antistatic agent and a phosphine oxide.

The polyamides with which this invention is concerned are well known in the art as being characterized by the presence of recurring carbonamide groups as an integral part of the polymer chain and wherein such groups are separated by at least two carbon atoms. Normally, these polymers are prepared by the polymerization of lactams or by the poly-condensation of aminocarboxylic acids or of diamines and dicarboxylic acids. Exemplary polymers include polycaprolactam, poly(aminodecanoic acid), poly(pyrrolidone), poly(hexamethylene adipamide), poly(hexamethylene sebacamide), and poly(hexamethylene terephthalamide), and the like. This invention relates to normally solid fiber-forming polyamides and nonfiber-forming polyamides as well as liquid polyamides. This invention can also be applied to blends of polyamides. In general this invention is directed to any polyamide compositions which have their thermal stability adversely affected by the type of antistatic agent described above.

When the polyamides are to be employed for forming fibers, the polymerization is usually continued until the material has polymerized to a fiber-formable stage. The polymers thus obtained have high melting points and can be cold drawn to form strong highly oriented fibers.

As is known in the art the diamines, dicarboxylic acids, and amide-forming derivatives thereof which can be used as reactants to yield the fiber-forming polyamides are well known in the art. Suitable diamines include for example, those represented by the general formula $NH_2 - R - NH_2$ in which R is a divalent hydrocarbon radical having from 2 to 20 carbon atoms. Representative examples are ethylene diamine, propylene diamine, tetramethylene diamine, pentamethylene diamine, hexamethylene diamine, octamethylene diamine, and decamethylene diamine. Well known dicarboxylic acid reactants include those represented by the general formula:

HOOCRCOOH in which R is as defined above. These dicarboxylic acids may be illustrated by sebacic acid, octadecanedioic acid, adipic acid, suberic acid, azelaic acid, undecanedioic acid, glutaric acid, pimelic acid, brassylic acid, tetradecanedioic acid, terephthalic acid, and isophthalic acid.

In place of the above-noted dicarboxylic acids and diamines those skilled in the art recognize that the amide-forming derivatives thereof can be employed to form fiber-forming polymers. Amide-forming derivatives of the diamines include the carbamates and N-formyl derivative. Amide-forming derivatives of the dibasic carboxylic acids comprise the mono- and diester, the anhydride, and mono- and diamide, and the acid halide.

In addition to the above diamines and dicarboxylic acids and their derivatives, it is also known in the art that the polyamides may be prepared from certain of the amino acids. The amino acids are represented by the general formula:

$H_2N - R - COOH$ in which R is as defined above. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, and 22-aminobehenic acid. Also the lactams of these amino acids may be used as monomers from which the polyamides of the present invention may be prepared. These types of polyamides are included in the scope of the polyamides with which this invention is concerned.

In addition to the homopolyamides, copolyamides and terpolyamides are also contemplated and are within the scope of this invention. It is known in the art that copolyamides and terpolyamides can be obtained employing mixtures of diamines and dibasic acids, with the total diamine being present in substantially equimolar proportions to the total dibasic acids present during the polymer-forming reaction. Co- and terpolymeric products may be formed directly from the corresponding monomers, or one or more homopolymers may be added to the polymerizable reactants, distribution of the desired units entering the products via amide interchange. Formation of the desired diamine salts of the various dibasic acids prior to melt polymerization assists in control of the reaction. The conventional polyamide melt polymerization cycle is suitable.

As stated above, this invention is related to polymide compositions containing as an antistatic agent a product resulting when the condensation product of ethylene oxide, propylene oxide, and ethylene diamine is reacted further with certain dicarboxylic acid esters.

The reaction product of ethylene oxide with the condensation product of propylene oxide and an alkylene diamine that is employed in preparing the antistatic agent with which this invention is concerned can be represented by the general formula:

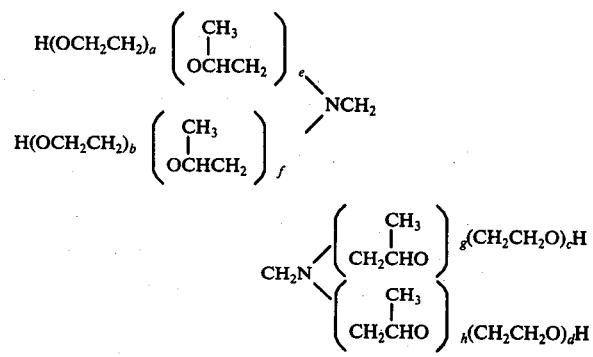

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850. The block polymers shown in the formula are often referred to as tetrol compounds. That terminology will be used in this application. Suitable tetrol compounds are commercially available (BASF Wyandotte) under the trademark Tetronic as a series of the poly(oxyethylene)-poly(oxypropylene) block copolymers having molecular weights ranging from about 1650 to about 135,000. The chain lengths of the poly(oxyethylene) and the poly(oxypropylene) moieties vary in this series. For use as an antistatic agent in polyamide it is preferred that the ethylene oxide moieties make up from about 10 to about 90 weight percent of the tetrol compound.

In the context of the instant invention, the molecular weights of the preferred tetrol compounds range from about 4,000 to about 50,000 and the ethylene oxide moiety contents preferably range from about 20 to about 80 weight percent of the compounds.

The preparation of some of the tetrol compounds employed in preparing the antistatic agents is stated in the above-mentioned French patent to be shown in U.S. Pat. Nos. 2,979,528 and U.S. 3,207,791. The disclosure of those two U.S. patents is incorporated herein by reference.

As is pointed out in the above-mentioned French patent, the tetrol compounds are prepared under standard oxyalkylation conditions, for example at pressures in the range of 2.39 to 6.33 kg/cm², a temperature in the range of 100° to 175° C., in the presence of a conventional oxyalkylation catalyst.

The dicarboxylic acid esters reacted with the tetrol compounds to prepare the antistatic agent with which this invention is concerned can be represented by the general formula

R'OOC — A — COOR' wherein A is a valence bond or a divalent hydrocarbyl radical having 1 to 8 carbon atoms and R' is an alkyl group containing 1 to 4 carbon atoms or a hydroxyalkyl group containing 2 to 4 carbon atoms. The R' radicals can be the same or different.

Acyclic aliphatic dicarboxylic acid esters that would be suitable for the preparation of the antistatic agent would include, for example, the esters of oxalic acid, malonic acid, succinic acid, glutaric acid, adipic acid, pimelic acid, suberic acid, azelaic acid, sebacic acid, and mixtures thereof.

Examples of the cycloaliphatic dicarboxylic acid esters which can be used in the preparation of the antistatic agents include the esters of dicarboxylic acids of cycloaliphatic hydrocarbons such as cyclohexane, cycloheptane, cyclooctane, and mixtures thereof.

Typical aromatic dicarboxylic acid esters that can be employed in preparing the antistatic agent include esters of phthalic acid, isophthalic acid, terephthalic acid, and the like, and mixtures thereof.

As pointed out in the previously mentioned French patent the antistatic agent is prepared by reacting the dicarboxylic acid ester with the tetrol compound in a respective molar ratio in the range of between 0.5/1.0 and 1.0/1.0, and preferably between 0.7/1.0 and 0.95/1.0, commonly in an inert atmosphere, at a temperature of between 60° and 160° C., at either atmospheric or reduced atmospheric pressure, for a period of between 1 and 4 hours. According to the French patent the reaction is preferably carried out at a reduced pressure at a temperature of between 70° and 150° C. for 1 to 2 hours.

In preparing the antistatic agent a catalyst may be employed. Suitable catalysts are transesterification catalysts, such as, for example, sodium hydroxide, potassium hydroxide, etc. The catalyst is used, of course, in catalytic quantities, ranging between 0.01 and 0.2 parts per 100 parts by weight of reactants. When a transesterification catalyst is used, it is necessary to neutralize any residual quantity of catalyst by conventional methods after completion of the reaction. The product of this reaction ranges from a viscous liquid to a hard wax. The hard wax, when heated or subjected to elevated temperatures, is converted into a highly viscous liquid, which, by way of illustration, will have a viscosity at 100° C. of between 200 and 40,000 centipoises, the same viscosity range applying in the case when liquid products are obtained.

According to this invention, when the above-described antistatic agent is employed in a polyamide the thermal stability of the polyamide composition is improved by also employing a stabilizing amount of a phosphine oxide having the following general formula:

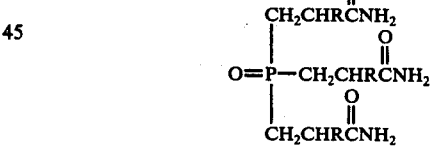

where each R is individually selected from the group consisting of hydrogen or an alkyl group containing 1 to 4 carbon atoms. Examples of suitable phosphine oxides include those such as tris(2-methyl-2-carbamoylethyl) phosphine oxide, tris(2-ethyl-2-carbamoylethyl) phosphine oxide, tris(2-propyl-2-carbamoylethyl) phosphine oxide, and bis(2-carbamoylethyl)-2-butyl-2-carbamoethylphosphine oxide. A particularly preferred phosphine oxide is tris(2-carbamoylethyl) phosphine oxide.

The phosphine oxide is employed in an amount which will improve the thermal stability of the antistatic polyamide composition by substantially reducing tensile strength loss on exposure to heat. Generally, the amount of phosphine oxide ranges from 0.025 to 2.5 parts by weight per 100 parts of polymer plus antistatic agent by weight, more preferably from about 0.05 to about 1.5 parts by weight per 100 parts by weight of polymer plus antistatic agent.

Preferably, the phosphine oxide is added to a melt of the antistatic agent, and the resulting composition then added to the polyamide. However, the phosphine oxide and the antistatic agent can be added to the materials which will be reacted to form the polyamide, or the phosphine oxide can be blended into the molten polyamide before or after the blending in of the antistatic agent.

Generally, the antistatic agent is used in amounts ranging from about 1 to about 12 weight percent, more preferably from about 2 to about 8 weight percent, based on polymer plus agent.

The antistatic polyamide compositions of this invention can also be admixed with other additives conventionally used in polyamides, such as dyes, pigments, delusterants, optical brightening agents, nucleating agents, and the like, providing these additives do not react in an antagonistic fashion with the invention compositions.

A better understanding of the invention will be provided by the following examples.

EXAMPLE I

The antistatic agent was prepared by mixing 2120 parts by weight of Tetronic 1506, a normally solid tetrol compound having an ethylene oxide moiety content of about 60 weight percent and a molecular weight of about 20,000, and 2.1 parts by weight of an aqueous solution containing 90 percent by weight of potassium hydroxide dissolved in about 15 ml of methanol in a suitable vessel. The mixture was heated with stirring at about 150° C. at a pressure of 2 mm Hg for ½ hour. The vacuum was replaced with a nitrogen atmosphere and 14.3 parts by weight dimethyl terephthalate was added which corresponds to about 0.7 mole diester per mole of tetrol compound. This mixture was heated to 145° C. with stirring and the pressure reduced to 2 mm Hg for 1 hour, after which the methanol present ceased to distill. The potassium hydroxide catalyst was neutralized with 1.5 ml of 85 percent orthophosphoric acid, the water was removed at about 115° C., and the product recovered. The product was a solid waxy material melting at about 50° C. which had a viscosity of 17,000 centipoises at 100° C.

EXAMPLE II

Poly(hexamethylene adipamide) of fiber grade quality was used as the polyamide in the various compositions described below. The composition of Run 1 contained neither antistatic agent nor phosphine oxide. In Runs 2-5, 4 parts by weight of the antistatic agent condensation product of Example I (TDMT) was admixed with 96 parts by weight of polyamide to form each antistatic composition. The amount of tris(2-carbamoylethyl) phosphine oxide (CARPO) added to the stabilized compositions based on the weight of the polyamide plus antistatic agent is shown in Table I.

The following procedure was followed in preparing and testing the compositions. The antistatic agent (TDMT) was melted on a steam bath and the appropriate amount of CARPO, if used, was stirred into the viscous melt. Each melt was then cooled to give a solid waxy slab which was cut into small pieces and dried at room temperature under vacuum for 15-20 hours. The polyamide chip employed was dried 20 hours at 120° C. under vacuum. The dried polyamide chip and each antistatic formulation were kept sealed in a dry atmosphere until just prior to pelletization, at which time the chip and additive were tumbled together to give an intimate mixture. Each dry blended composition was further homogenized and pelletized by utilizing a one-inch extruder containing a 24:1 length to diameter screw at a melt temperature at the die entrance of 525° F. and a one minute residence time. A nitrogen blanket was used on the feed hopper. Each pelleted sample was dried at 120° C. under vacuum for 20 hours before being spun into fibers on an experimental size piston extruder having a ⅜ inch diameter barrel at a melt temperature of 560° F. and a polymer throughput of 1 cc/minute. The extruder capacity was 20 grams of resin and it was equipped with a 6-hole spinnerette having a length/diameter orifice dimension of 12:9 in mils. The resulting fibers were drawn 3 to 1 (3X) at 330° F. to obtain 6-denier per filament yarn. Tensile properties were determined on the stretched yarn. In determining thermal stability, each resin sample was charged to the extruder maintained at 560° F., and a portion of each charge was converted immediately into fibers. The remaining charge was held at 560° F. for 30 minutes and a portion of it converted into fibers while the remainder of the charge was held an additional 15 minutes (45 minutes total residence time) before it, too, was converted into fibers. In Table I the thermal stability is reflected by comparing tensile properties of the fibers spun immediately with the tensile properties of the fibers spun from material held in the extruder barrel the designated times. The results are presented in Table I.

Table I

| Thermal Stability of Antistatic Polyamide Containing CARPO | | | | | |
|---|---|---|---|---|---|
| Run No. | 1[d] | 2 | 3 | 4 | 5 |
| CARPO[a] | None | None | 0.1 | 0.3 | 0.5 |
| Residence Time in Piston Extruder: | | | | | |
| One Minute: Ten[b] | 3.5 | 3.7 | 3.9 | 3.4 | 3.4 |
| Elong[c] | 108 | 97 | 97 | 100 | 108 |
| 30 Minutes: Ten | 3.7 | 1.5 | 2.1 | 2.1 | 2.5 |
| Elong | 94 | 16 | 18 | 32 | 72 |
| 45 Minutes: Ten | 3.3 | 2.1 | 2.7 | 2.7 | 2.9 |
| Elong | 98 | 36 | 29 | 77 | 92 |

[a]Parts by weight of CARPO per hundred parts by weight of polyamide containing TDMT.
[b]Ten is tenacity as grams per denier.
[c]Elong is percent elongation at break.
[d]Control 1 - No TDMT antistatic agent employed.

The data show that the polyamide control composition of Run 1 does not appreciably degrade during the test period as evidenced by the minor difference in the tenacity and elongation values of fibers spun from the resin held for one minute, 30 minutes, and 45 minutes in the extruder. Run 2 shows that the polyamide containing the antistatic agent is undergoing thermal degradation as the drastic reduction in tenacity and elongation values clearly show with fibers prepared from the heat-aged samples. When CARPO is added the thermal stability of the mixture of polyamide and antistatic agent is improved as the invention runs 3, 4, and 5 show. The improvement in thermal stability increases generally as the CARPO concentration is increased as shown by the trend in tensile properties of fibers prepared from each sample after the one minute, 30 minutes, and 45 minutes residence times in the extruder.

The foregoing examples have been provided merely to further illustrate the instant invention and are not intended to be limiting of this invention, the essence of which is the employment of the disclosed phosphine oxides as stabilizers for polyamide compositions containing the specifically disclosed antistatic agents.

What is claimed is:

1. A composition of matter comprising a polyamide; an antistatic property imparting amount of an antistatic agent comprising the reaction product of (1) a tetrol compound of the formula

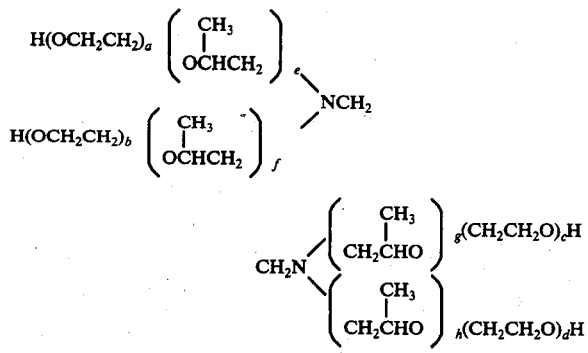

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850, wherein the molecular weight of said tetrol compound is between about 1,650 to about 135,000 and said ethylene oxide moieties make up from about 10 to about 90 weight percent of said tetrol compound, and (2) a dicarboxylic acid ester having the formula

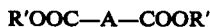

wherein A is a valence bond of a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and a thermally stabilizing amount of a phosphine oxide of the formula

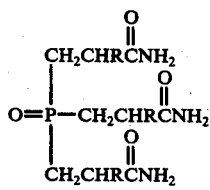

wherein each R is individually selected from the group consisting of hydrogen or an alkyl group containing 1 to 4 carbon atoms.

2. A composition according to claim 1 wherein the phosphine oxide is tris(2-carbamoylethyl)phosphine oxide.

3. A composition according to claim 2 wherein the antistatic agent is prepared by reacting a tetrol compound having an ethylene oxide moiety content of about 60 weight percent and a molecular weight of about 20,000 with dimethyl terephthalate.

4. A composition of claim 3 wherein the polyamide is poly(hexamethyleneadipamide).

5. A composition of claim 1 wherein the dicarboxylic acid ester employed in preparing the antistatic agent is a cycloaliphatic dicarboxylic acid ester selected from the group consisting of the esters of dicarboxylic acids of cyclohexane, cycloheptane, and cyclooctane.

6. A composition according to claim 1 wherein the dicarboxylic acid ester employed in preparing the antistatic agent is a phthalic acid ester, an isophthalic acid ester, or a terephthalic acid ester.

7. A composition according to claim 1 wherein the antistatic agent accounts for about 1 to about 12 weight percent of the weight of the polymer and antistatic agent combined and wherein about 0.025 to about 2.5 parts by weight of phosphine oxide are present for every 100 parts by weight of polymer plus antistatic agent.

8. A composition according to claim 7 wherein the dicarboxylic acid ester employed in preparing the antistatic agent is a terephthalic acid ester.

9. A composition of claim 8 wherein the terephthalic acid ester is dimethyl terephthalate.

10. A composition according to claim 9 wherein the phosphine oxide is tris(2-carbamoylethyl)phosphine oxide.

11. A composition according to claim 7 wherein the molar ratio of the dicarboxylic acid ester to the tetrol compound in preparing the antistatic agent is in the range of from 0.5/1.0 to 1.0/1.0.

12. A composition according to claim 11 wherein the antistatic agent accounts for about 2 to about 8 weight percent of the polymer and antistatic agent combined and wherein about 0.05 to about 1.5 parts by weight of phosphine oxide are present for every 100 parts by weight of polymer plus antistatic agent.

* * * * *

UNITED STATES PATENT AND TRADEMARK OFFICE
CERTIFICATE OF CORRECTION

PATENT NO. : 4,043,972
DATED : August 23, 1977
INVENTOR(S) : Ronald D. Mathis

It is certified that error appears in the above-identified patent and that said Letters Patent are hereby corrected as shown below:

Column 3, lines 37 and 38, delete "stated in the above-mentioned French patent to be";

Column 3, line 39, delete "and U.S. 3,207,791";

Column 3, line 40, delete "those two" and insert --- that ---, and delete "patents" and insert --- patent ---; and Column 8, lines 25, 28, 44 and 47, delete "polymer" and insert --- polyamide ---.

Signed and Sealed this

Eighth Day of August 1978

[SEAL]

Attest:

RUTH C. MASON
Attesting Officer

DONALD W. BANNER
Commissioner of Patents and Trademarks